US012763688B2

(12) United States Patent
Liu et al.

(10) Patent No.: US 12,763,688 B2
(45) Date of Patent: Oct. 13, 2026

(54) HYBRID SWITCHING CONVERTER

(71) Applicant: Richtek Technology Corporation, Hsinchu (TW)

(72) Inventors: Kuo-Chi Liu, Hsinchu (TW); Ta-Yung Yang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 115 days.

(21) Appl. No.: 18/970,910

(22) Filed: Dec. 6, 2024

(65) Prior Publication Data

US 2025/0300558 A1 Sep. 25, 2025

Related U.S. Application Data

(60) Provisional application No. 63/568,432, filed on Mar. 21, 2024.

(30) Foreign Application Priority Data

Oct. 23, 2024 (TW) ................................ 113140435

(51) Int. Cl.

*H02M 3/158* (2006.01)
*H02M 1/00* (2006.01)
*H02M 3/07* (2006.01)

(52) U.S. Cl.

CPC ......... *H02M 3/158* (2013.01); *H02M 1/0009* (2021.05); *H02M 1/0095* (2021.05); *H02M 3/07* (2013.01); *H02M 3/1584* (2013.01); *H02M 3/1586* (2021.05)

(58) Field of Classification Search

CPC .. H02M 3/158; H02M 1/0009; H02M 1/0095; H02M 3/07; H02M 3/1584; H02M 3/1586

See application file for complete search history.

(56) References Cited

U.S. PATENT DOCUMENTS 7,317,305 B1 * 1/2008 Stratakos ............ H02M 3/1584 323/282
2015/0015225 A1 * 1/2015 Cheng ................ H02M 3/1584 323/282
2021/0367511 A1 * 11/2021 Liu ......................... H02M 3/01
2021/0367520 A1 * 11/2021 Liu ....................... H02M 3/158

(Continued)

*Primary Examiner* — Yusef A Ahmed
(74) *Attorney, Agent, or Firm* — Huan-Yi Lin

(57) ABSTRACT

A hybrid switching converter includes plural switches and a control circuit. The plural switches include first to (K+1)th high-side switches. A first terminal of a first flying capacitor is coupled to an input voltage through the first high-side switch, and first terminals of each of second to Kth flying capacitors are respectively coupled to the first terminal of the preceding flying capacitor through the second to Kth high-side switches. Second terminals of each of the first to Kth flying capacitors are respectively electrically connected to second terminals of first to Kth inductors at first to Kth switching nodes. A first terminal of the (K+1)th high-side switch is electrically connected to the first terminal of the Kth flying capacitor, and a second terminal of the (K+1)th high-side switch is electrically connected to a second terminal of a (K+1)th inductor at a (K+1)th switching node. The control circuit generates plural control signals to control the plural switches for periodic switching.

10 Claims, 12 Drawing Sheets

(56) References Cited

U.S. PATENT DOCUMENTS

| | | | | |
|---|---|---|---|---|
| 2022/0006376 | A1* | 1/2022 | Lu | G01R 19/16566 |
| 2023/0179093 | A1* | 6/2023 | Liu | H02M 1/0009 323/271 |
| 2023/0223843 | A1* | 7/2023 | Liu | H02M 1/083 363/21.02 |
| 2023/0412073 | A1* | 12/2023 | Ge | H02M 3/01 |
| 2024/0146188 | A1* | 5/2024 | Pilawa-Podgurski | H02M 1/007 |
| 2024/0235370 | A1* | 7/2024 | Liu | H02M 3/07 |
| 2024/0297580 | A1* | 9/2024 | Liu | H02M 1/0095 |
| 2024/0372467 | A1* | 11/2024 | Liu | H02M 1/0095 |
| 2024/0405683 | A1* | 12/2024 | Liu | H02M 3/158 |
| 2025/0112549 | A1* | 4/2025 | Liu | H02M 3/07 |
| 2025/0266746 | A1* | 8/2025 | Wu | H02M 3/1586 |
| 2026/0066789 | A1* | 3/2026 | Liu | H02M 1/44 |
| 2026/0100645 | A1* | 4/2026 | Liu | H02M 1/009 |
| 2026/0135464 | A1* | 5/2026 | Liu | H02M 1/0095 |

* cited by examiner

HYBRID SWITCHING CONVERTER

CROSS REFERENCE

The present invention claims priority to US 63/568,432 filed on Mar. 21, 2024 and claims priority to TW 113140435 filed on Oct. 23, 2024.

BACKGROUND OF THE INVENTION

Field of Invention

The present invention relates to a hybrid switching converter, and more specifically to a hybrid switching converter capable of supporting multiple voltage conversion ratios with high-efficiency operation.

Description of Related Art

FIG. 1 illustrates a prior art two-phase buck converter. The conventional two-phase buck converter comprises two buck converters connected in parallel to extend the output current (Iout). This prior art requires high-rated-voltage switches to withstand the maximum input voltage (Vin). Due to the high voltage across the inductors L1 and L2, larger inductance values are required for inductors L1 and L2 and thus causing larger form factor.

SUMMARY OF THE INVENTION

From one perspective, the present invention provides a hybrid switching converter configured to convert an input power into an output power, wherein the output power includes an output voltage and an output current, and the input power includes an input voltage. The hybrid switching converter comprises a plurality of switches, including a first to a (K+1)th high-side switches, where K is an integer greater than or equal to 2; a first to a (K+1)th inductors, each having a first terminal electrically connected in parallel to the output voltage; a first to a Kth flying capacitors, wherein a first terminal of the first flying capacitor is coupled to the input voltage through the first high-side switch, a first terminal of each of the second to Kth flying capacitors is respectively coupled to a first terminal of the corresponding preceding flying capacitor through the second to Kth high-side switches, and second terminals of the first to Kth flying capacitors are respectively electrically connected to second terminals of the first to Kth inductors at a first to a Kth switching nodes, a first terminal of the (K+1)th high-side switch is electrically connected to the first terminal of the Kth flying capacitor, and a second terminal of the (K+1)th high-side switch is electrically connected to a second terminal of the (K+1)th inductor at a (K+1)th switching node; and a control circuit configured to generate a plurality of control signals with a switching frequency to control the plurality of switches periodic for switching, thereby magnetizing the first to Kth inductors through the corresponding first to Kth flying capacitors and magnetizing the (K+1)th inductor through the (K+1)th high-side switch.

In one preferred embodiment, the plurality of switches further comprises a first to a (K+1)th low-side switches, each of the first to (K+1)th low-side switches being coupled between the first to (K+1)th switching nodes and a ground potential.

In one preferred embodiment, the first to (K+1)th high-side switches and the corresponding first to (K+1)th low-side switches are switched inversely.

In one preferred embodiment, during steady-state operation, the first to (K+1)th switching nodes periodically switch between 1/(K+1) of the input voltage and the ground potential, and the voltage across each of the first to Kth flying capacitors corresponds to K/(K+1) to 1/(K+1) of the input voltage.

In one preferred embodiment, the plurality of control signals operate the plurality of switches with a duty cycle close to 50%, such that the voltage conversion ratio between the input voltage and the output voltage is 2 (K+1): 1.

In one preferred embodiment, the first to (K+1)th inductors are magnetically coupled to each other via a magnetic material. Alternatively, where K+1 is an even number, the first to (K+1)th inductors are magnetically coupled in pairs via a magnetic material.

In one preferred embodiment, the control circuit generates the control signals with (K+1)-phase control to control the first to (K+1)th high-side switches and the first to (K+1)th low-side switches to switch alternately, thereby magnetizing the first to (K+1)th inductors sequentially.

In one preferred embodiment, wherein K+1 is an even number, the control circuit generates the control signals with 2-phase control to alternately control the switches of odd-numbered and even-numbered sequences among the first to (K+1)th high-side switches and the first to (K+1)th low-side switches, thereby alternately magnetizing the inductors of odd-numbered and even-numbered sequences among the first to (K+1)th inductors.

In one preferred embodiment, wherein K is 3, when the first high-side switch is in an on-state, the first inductor is magnetized by the input voltage through the first flying capacitor; when the second high-side switch is in an on-state, the second inductor is magnetized through the first flying capacitor and the second flying capacitor; when the third high-side switch is in an on-state, the third inductor is magnetized through the second flying capacitor and the third flying capacitor; and/or when the fourth high-side switch is in an on-state, the fourth inductor is magnetized through the third flying capacitor.

In one preferred embodiment, the plurality of control signals includes a first control signal and a second control signal, and the control circuit determines the pulse initiation points of the first and second control signals respectively based on comparisons between a total inductor current and respective first and second ramp signals, thereby achieving valley current mode control of the hybrid switching converter and inherently balancing the voltages across the first to Kth flying capacitors, wherein the total inductor current is a summation of the inductor currents of the first to (K+1)th inductors and is related to the output current. In valley current mode, the pulse initiation point of the first control signal determines a first valley of the total inductor current, and the pulse initiation point of the second control signal determines a second valley of the total inductor current.

In one preferred embodiment, the first ramp signal and the second ramp signal have a phase difference of 180 degrees relative to each other.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
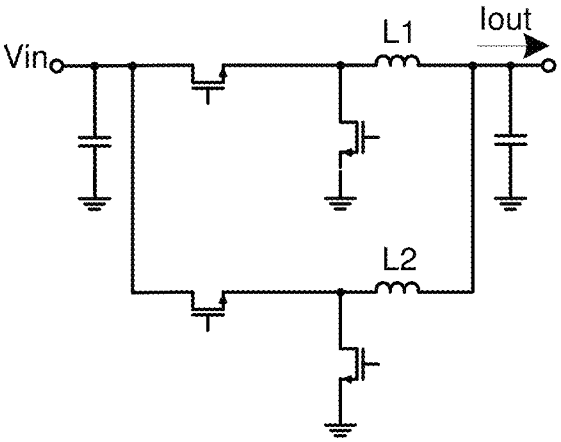
Fig. 1 (prior art)
FIG. 1 illustrates a prior art two-phase buck converter.
Figure 2:
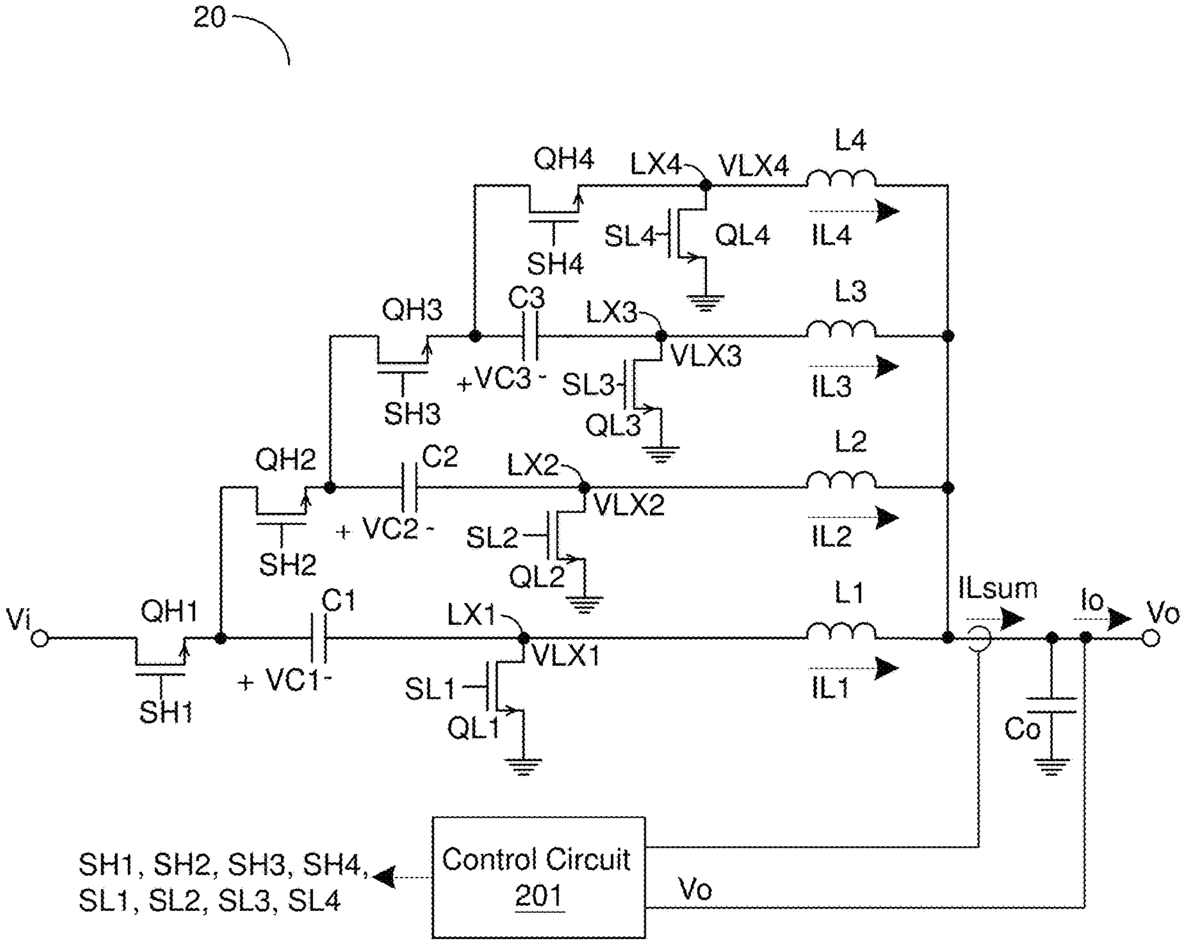
FIG. 2 shows a circuit schematic diagram of a hybrid switching converter according to an embodiment of the present invention.

FIG. 2 illustrates a circuit schematic diagram of a hybrid switching converter according to an embodiment of the present invention. As shown in FIG. 2, the hybrid switching converter 20 of the present invention is configured to convert an input power into an output power. The output power includes an output voltage (Vo) and an output current (Io), while the input power includes an input voltage (Vi). The hybrid switching converter 20 comprises a plurality of switches, inductors L1 to L (K+1), flying capacitors C1 to CK, and a control circuit 201, where K is an integer greater than or equal to 2. The embodiment with K equal to 3 shown in FIG. 2 will be described as an example but is not limited thereto, as other K values can be derived by those skilled in the art. Referring to FIG. 2, the plurality of switches includes high-side switches QH1 to QH4. Each first terminal of the inductors L1 to L4 is electrically connected in parallel to the output voltage Vo. A first terminal of the flying capacitor C1 is coupled to the input voltage Vi through the high-side switch QH1, while a first terminal of each of the flying capacitors $C_2$ to $C_3$ is respectively coupled to the first terminal of the corresponding preceding flying capacitors (i.e., C1 to C2) through high-side switches QH2 to QH3.

Each second terminal of the flying capacitors $C_1$ to $C_3$ is electrically connected to the corresponding second terminal of the inductors L1 to L3 at switching nodes LX1 to LX3. A first terminal of the high-side switch QH4 is electrically connected to the first terminal of the flying capacitor C3, and a second terminal of the high-side switch QH4 is electrically connected to the second terminal of the inductor L4 at the switching node LX4. The control circuit 201 generates a plurality of control signals SH1 to SH4 with a switching frequency to control the periodic switching of the switches QH1 to QH4, thereby magnetizing the inductors L1 to L3 through the corresponding flying capacitors $C_1$ to $C_3$ and magnetizing the inductor L4 through the high-side switch QH4. The plurality of switches further includes low-side switches QL1 to QL4, which are respectively coupled between the switching nodes LX1 to LX4 and a ground potential. During steady-state operation, the switching nodes LX1 to LX4 periodically switch between ¼ of the input voltage (i.e., 1/(K+1) of the input voltage) and the ground potential, and the voltage across the flying capacitors $C_1$ to $C_3$ corresponds to ¾ to ¼ of the input voltage, i.e., K/(K+1) to 1/(K+1) of the input voltage.

Figure 3:
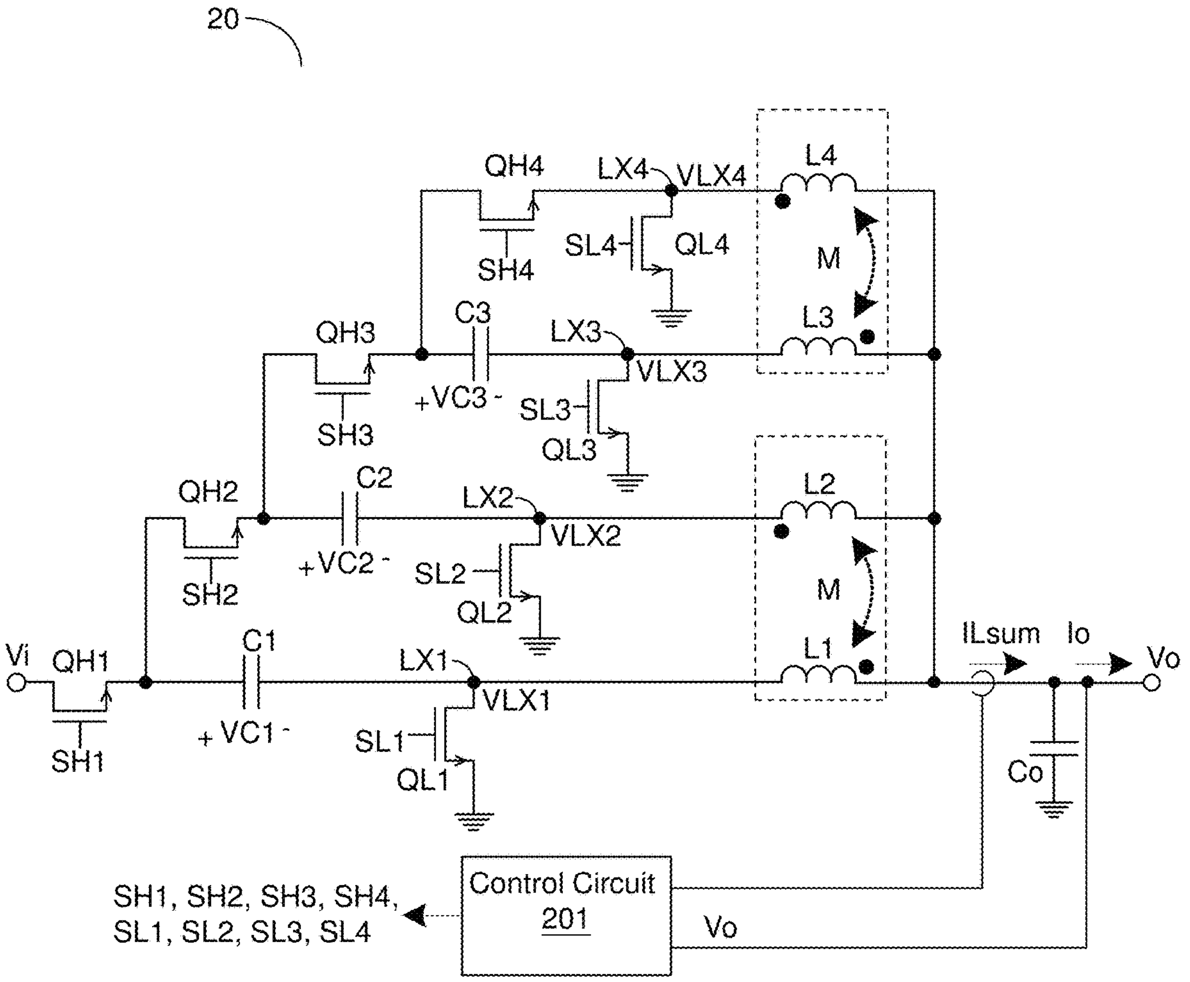
FIG. 3 shows a circuit schematic diagram of a hybrid switching converter according to another embodiment of the present invention.

FIG. 3 illustrates a circuit schematic diagram of a hybrid switching converter according to another embodiment of the present invention. This embodiment is similar to the embodiment shown in FIG. 2, and differs in that the inductors L1 to L4 are magnetically coupled in pairs via magnetic materials. In such embodiments, the number of inductors is even.

Figure 4:
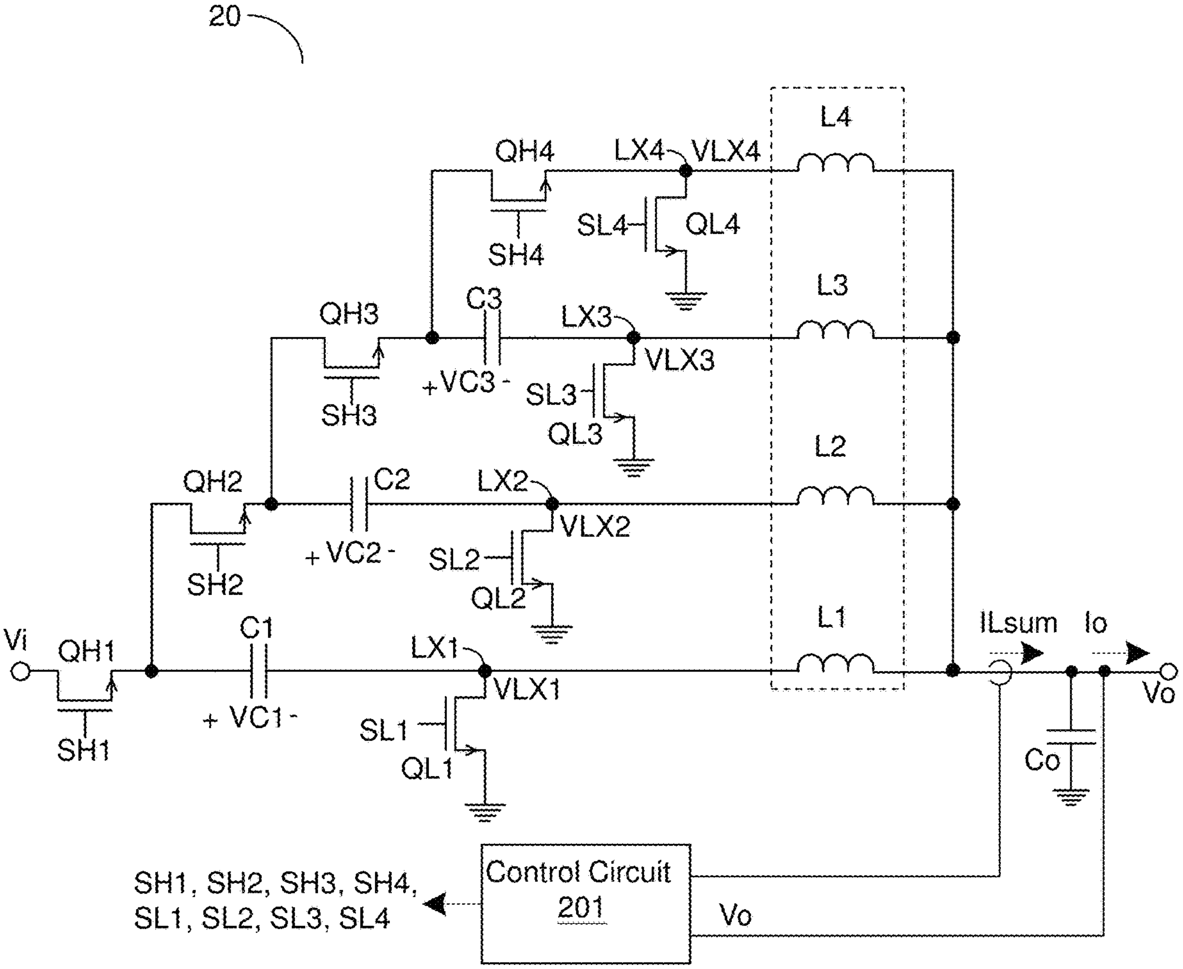
FIG. 4 shows a circuit schematic diagram of a hybrid switching converter according to yet another embodiment of the present invention.

FIG. 4 illustrates a circuit schematic diagram of a hybrid switching converter according to yet another embodiment of the present invention. This embodiment is similar to the embodiment shown in FIG. 2, and differs in that the inductors L1 to L4 are magnetically coupled to each other via magnetic materials.

Figure 5A:
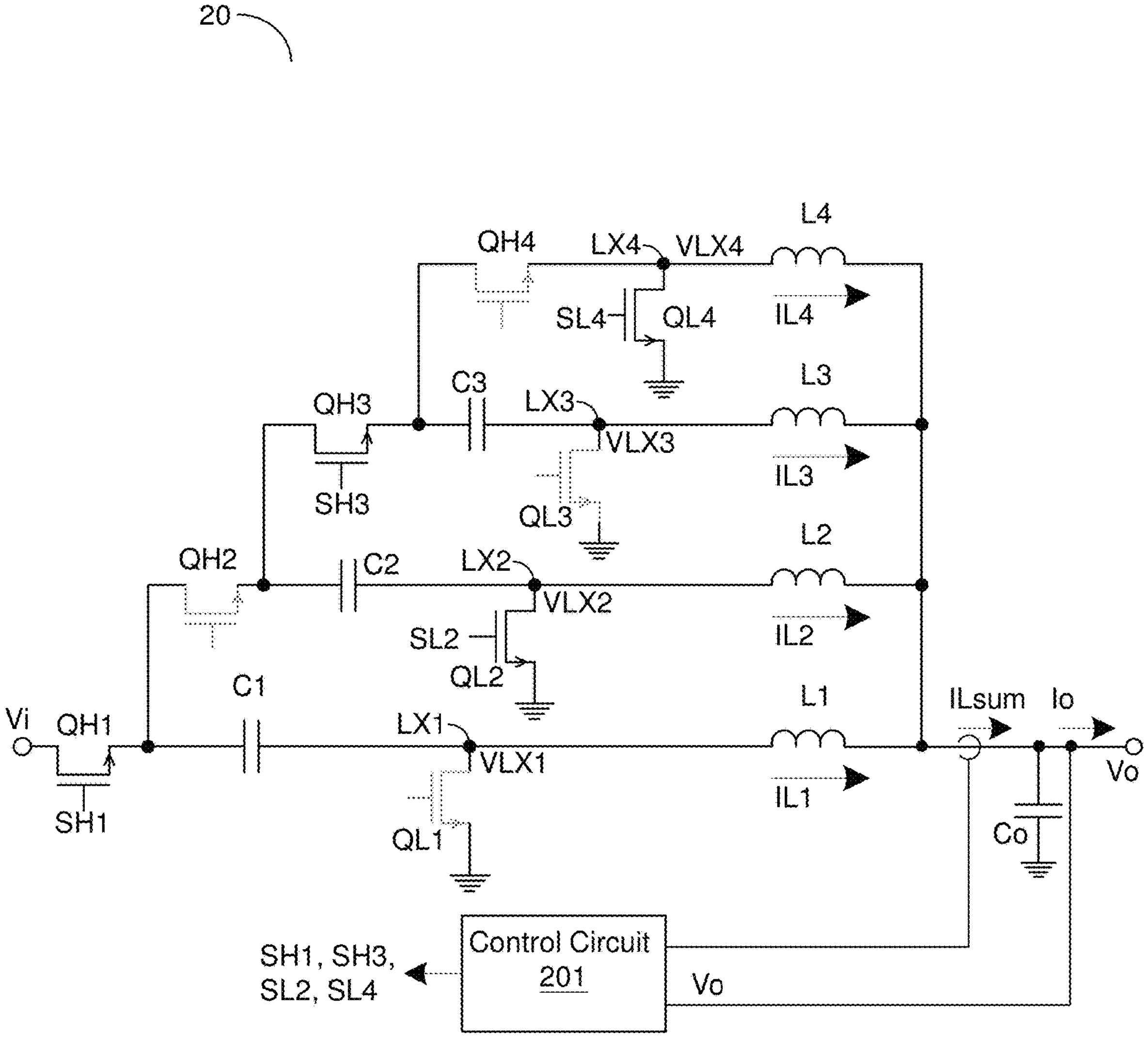
FIGS. 5A to 5C show circuit schematic diagrams and operational diagrams of a hybrid switching converter according to an embodiment of the present invention.
Figure 5B:
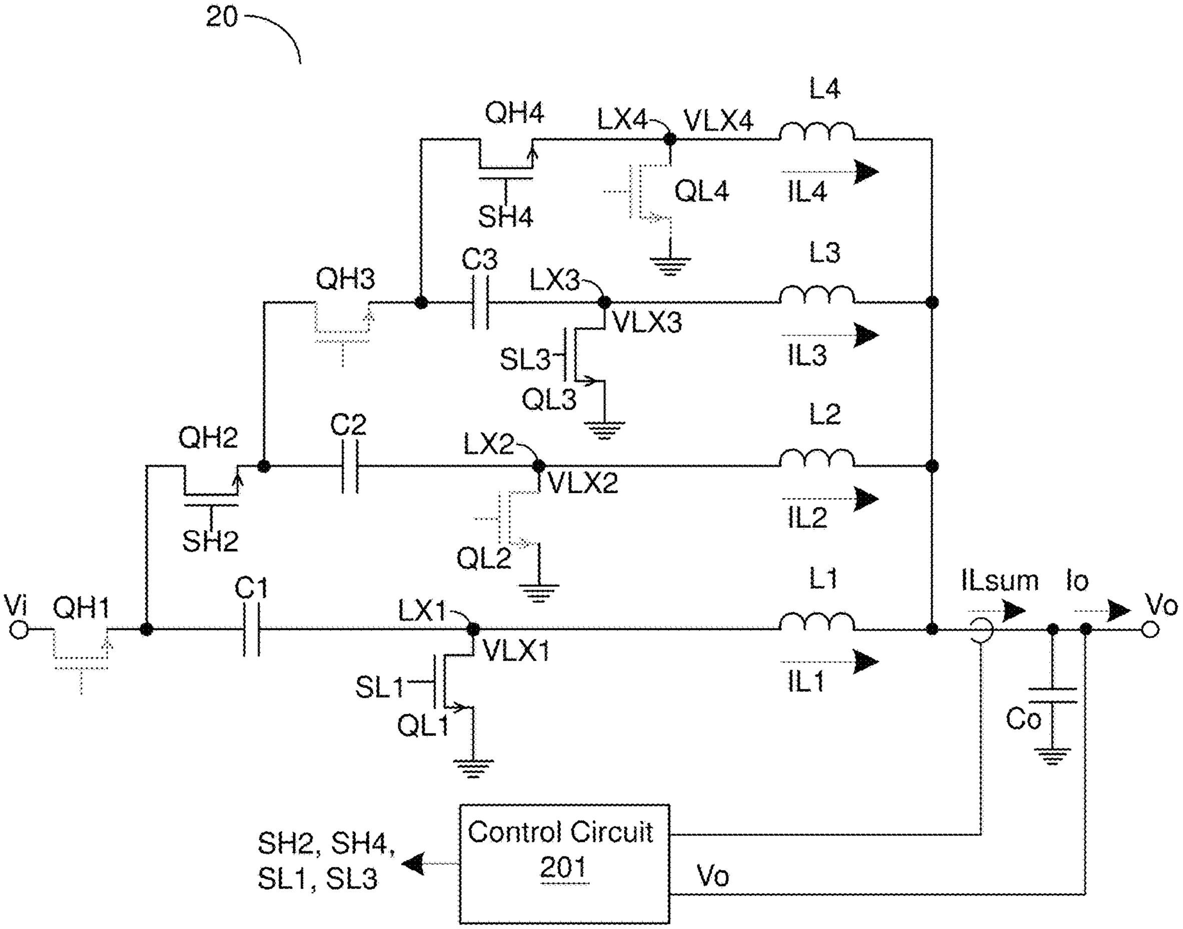
Figure 5C:
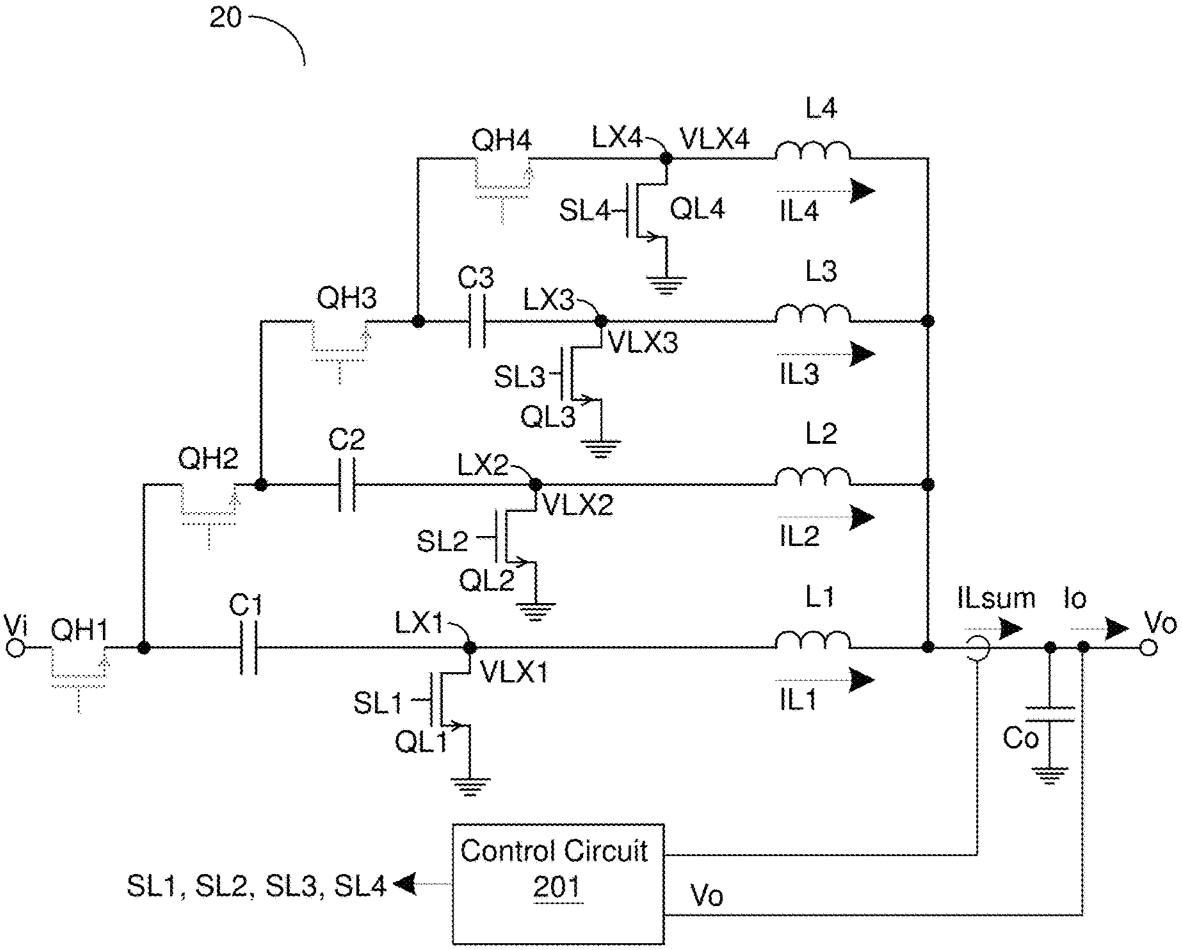

FIGS. 5A to 5C illustrate circuit schematic diagrams and operational diagrams of a hybrid switching converter according to an embodiment of the present invention. As shown in FIG. 5A, in the first state, due to the control signals SH1, SH3, SL2, and SL4 switching to an enabled level, the high-side switch QH1 is turned on, causing the inductor L1 to be magnetized by the input voltage Vi through the flying capacitor C1, and the high-side switch QH3 is turned on, causing the inductor L3 to be magnetized through the combined voltage across the flying capacitors C2 and C3. On the other hand, the low-side switches QL2 and QL4 are turned on, causing the inductors L2 and L4 to demagnetize.

As shown in FIG. 5B, in the second state, due to the control signals SH2, SH4, SL1, and SL3 switching to an enabled level, the high-side switch QH2 is turned on, causing the inductor L2 to be magnetized through the combined voltage across the flying capacitors C1 and C2, and the high-side switch QH4 is turned on, causing the inductor L4 to be magnetized through the voltage across the flying capacitor C3. On the other hand, the low-side switches QL1 and QL3 are turned on, causing the inductors L1 and L3 to demagnetize.

As shown in FIG. 5C, in the third state, due to the control signals SL1 to SL4 switching to an enabled level, the low-side switches QL1 to QL4 are turned on, causing the inductor currents IL1 to IL4 to flow continuously through the low-side switches QL1 to QL4 to the output voltage Vo, and the inductors L1 to L4 to demagnetize.

Figure 6:
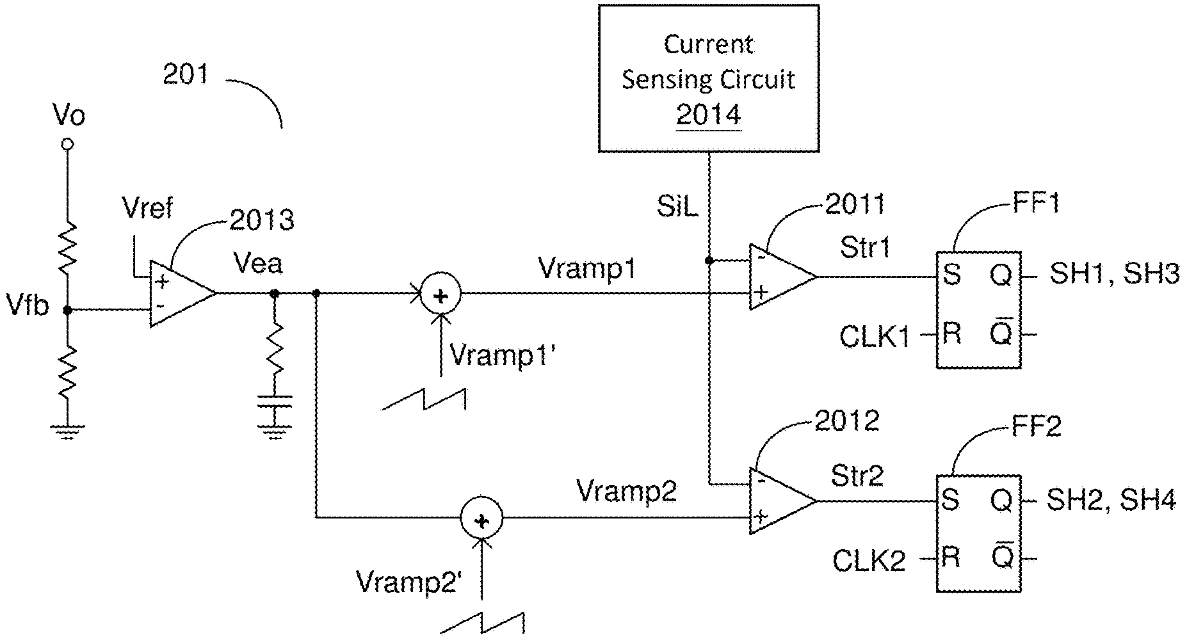
FIG. 6 shows a circuit schematic diagram of a control circuit of a hybrid switching converter according to an embodiment of the present invention.

FIG. 6 illustrates a circuit schematic diagram of a control circuit of a hybrid switching converter according to an embodiment of the present invention. The control circuit 201 shown in FIG. 6 is a specific embodiment of the control circuit 201 shown in FIG. 2. In one embodiment, as shown in FIG. 6, the control circuit 201 includes comparators 2011 and 2012. In one embodiment, the comparator 2011 compares the inductor current signal SiL with the ramp signal Vramp1 to generate a pulse-width modulation triggering signal Str1, thereby controlling the flip-flop FF1 in cooperation with the clock signal CLK1 to generate the control signals SH1 and SH3. Similarly, the comparator 2012 compares the inductor current signal SiL with the ramp signal Vramp2 to generate a pulse-width modulation triggering signal Str2, thereby controlling the flip-flop FF2 in cooperation with the clock signal CLK2 to generate the control signals SH2 and SH4. The ramp signal Vramp1 is generated by combining (e.g., superposing) the ramp signal Vramp1' with the error amplifier signal Vea, and the ramp signal Vramp2 is generated by combining the ramp signal Vramp2' with the error amplifier signal Vea. The error amplifier 2013 amplifies the difference between a feedback signal Vfb associated with the output voltage Vo and a reference signal Vref to generate the error amplifier signal Vea.

Figure 7:
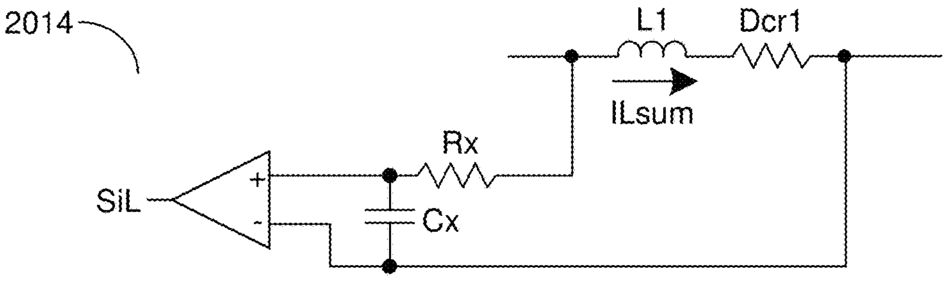
FIG. 7 shows a circuit schematic diagram of a current sensing circuit of a hybrid switching converter according to an embodiment of the present invention.

FIG. 7 illustrates a circuit schematic diagram of a current sensing circuit of a hybrid switching converter according to an embodiment of the present invention. This embodiment represents an exemplary implementation of the current sensing circuit 2014 shown in FIG. 6. In one embodiment, the inductor L1 includes a parasitic DC resistance Dcr1. The current sensing circuit 2014 comprises a sensing resistor Rx and a sensing capacitor Cx, which are connected in series and then coupled to the inductor L1. When the time constants of the inductor L1, the DC resistance Dcr1, the sensing resistor Rx, and the sensing capacitor Cx are matched, the total inductor current ILsum can be sensed by measuring the voltage across the sensing capacitor Cx. The inductor current signal SiL is then generated based on the voltage across the sensing capacitor Cx. Additional details of the current sensing circuit 2014 are well-known to those skilled in the art and are thus omitted for brevity.

It should be noted that the advantage of the DCR sensing method is its ability to reduce power loss in the current sensing resistor. The generation method of the inductor current signal SiL in FIG. 4 is not limited to the DCR sensing method. The inductor current signal SiL can also be generated using a current sensing resistor in series with the inductor L1, a current sensing transformer, flying capacitors C1 to C3, or at least one of the switches QH1 to QH3 and QL1 to QL3.

Figure 8:
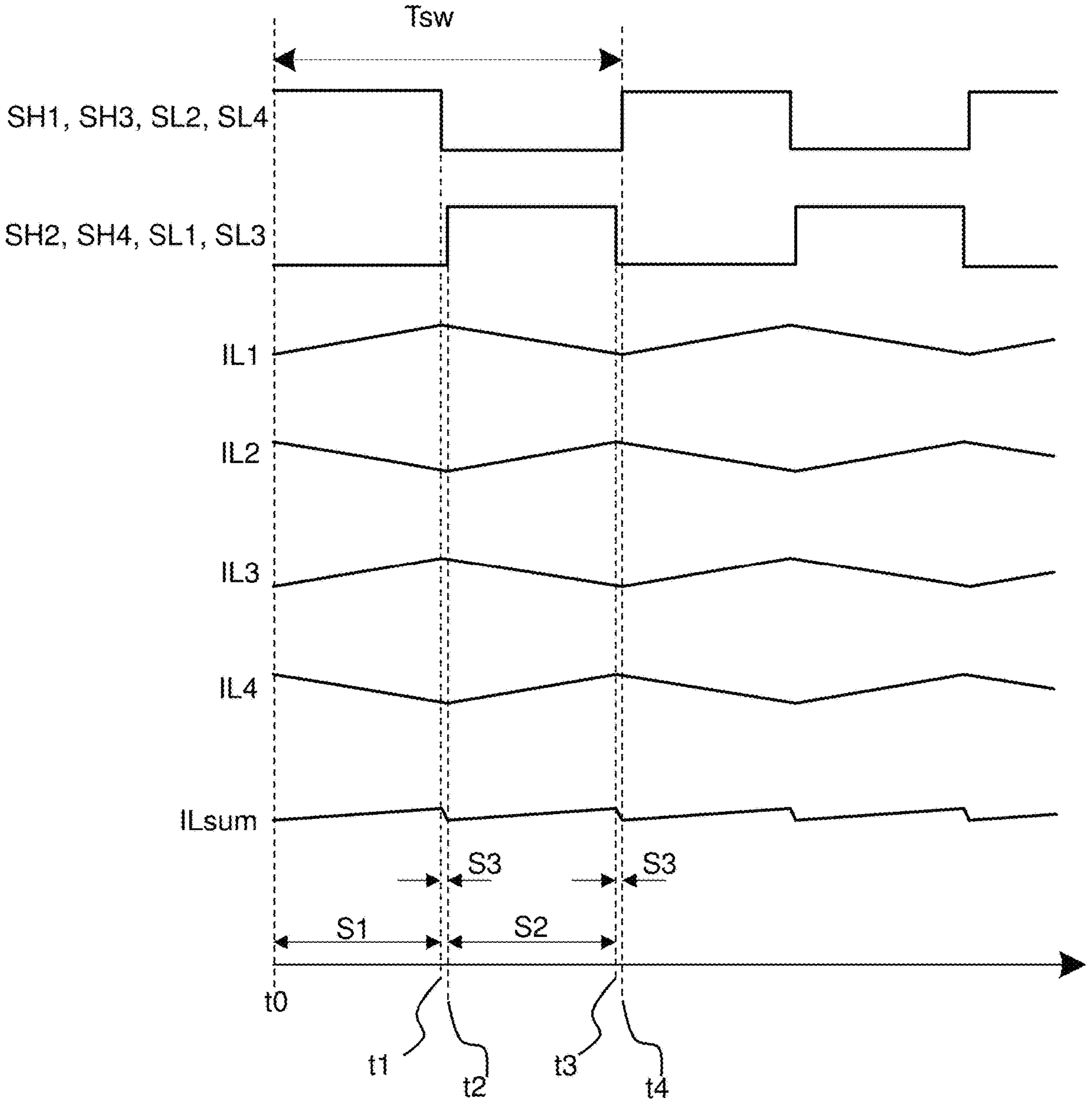
FIG. 8 shows a signal waveform diagram of related signals of a hybrid switching converter according to an embodiment of the present invention.

FIG. 8 illustrates signal waveform diagrams of related signals of a hybrid switching converter according to an embodiment of the present invention. The control signals SH1 to SH4, SL1 to SL4, inductor currents IL1 to IL4, and the total inductor current ILsum are shown in FIG. 8. As illustrated, the control signals SH1 to SH4 and SL1 to SL4 operate the switches QH1 to QH4 and QL1 to QL4 with a duty cycle close to 50%, resulting in a voltage conversion ratio of 8:1 (i.e., 2 (K+1): 1) between the input voltage Vi and the output voltage Vo.

Referring to FIG. 8 and FIG. 2, in an embodiment where K+1 is an even number, the control circuit 201 can generate control signals with 2-phase control to alternately control the odd-numbered and even-numbered switches among the high-side switches QH1 to QH (K+1) and the low-side switches QL1 to QL (K+1). This alternation achieves 2-phase sequential magnetization of the odd-numbered and even-numbered inductors among L1 to L (K+1). As shown in FIG. 8, the switching states between time points to to t4 are the first state (S1), third state (S3), second state (S2), and third state (S3), respectively. By four-phase operation, the switching node voltages VLX1 to VLX4 are all at ¼ Vi, and with a duty cycle close to 50%, the voltage conversion ratio of 8:1 is achieved, thereby avoiding efficiency issues caused by low-duty-cycle switching.

Figure 9:
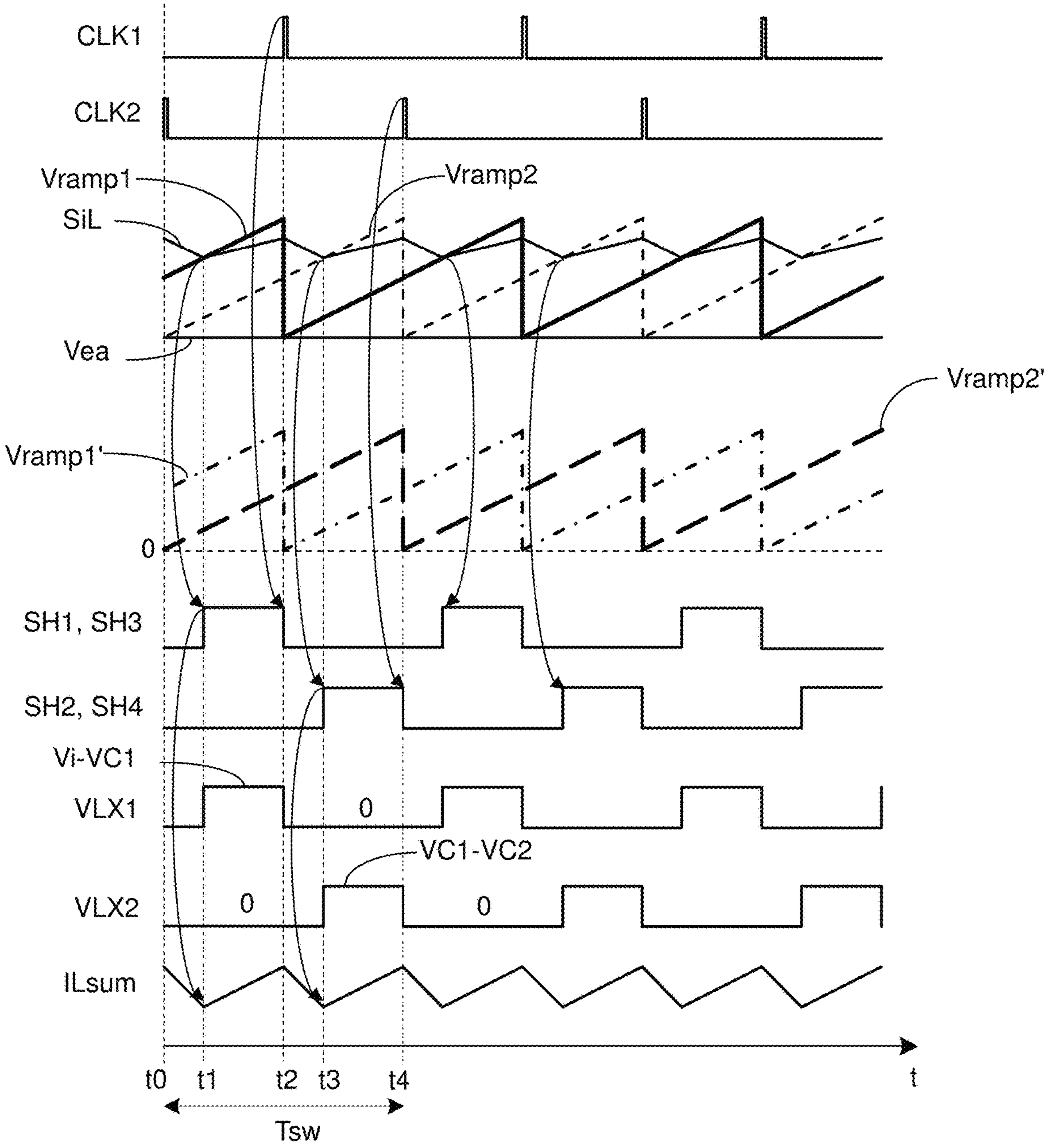
FIG. 9 shows a signal waveform diagram of related signals of a hybrid switching converter according to another embodiment of the present invention.

FIG. 9 illustrates signal waveform diagrams of related signals of a hybrid switching converter according to another embodiment of the present invention. Referring to FIG. 9 and FIG. 6, the plurality of control signals includes SH1, SH3, SH2, and SH4. The control circuit 201 determines the pulse initiation points of the control signals SH1, SH3, SH2, and SH4 based on comparisons between the inductor current signal SiL and the corresponding ramp signals Vramp1 and Vramp2, thereby achieving valley current mode control of the hybrid switching converter and inherently balancing the voltages across the flying capacitors C1 to C3. In valley current mode, the pulse initiation points of the control signals SH1 and SH3 (e.g., at time t1) determine the first valley of the total inductor current ILsum, while the pulse initiation points of the control signals SH2 and SH4 (e.g., at time t3) determine the second valley of the total inductor current ILsum. As shown in FIG. 9, in this embodiment, the switching node voltage VLX1 switches between ¼ Vi (i.e., Vi-VC1 or VC1, where VC1 is the voltage across the flying capacitor C1, which is ¾ Vi at stead state) and the ground potential. Tsw is the switching period in this embodiment. It should also be noted that in other embodiments, alternatively the switching node voltage VLX1 can switch between Vi and ¾ Vi.

It should further be noted that to ensure balanced control of the hybrid switching converter 20, the ramp signal Vramp1 and the ramp signal Vramp2 are phase-shifted by 180 degrees. Specifically, as shown in FIG. 9, at time t1, when the ramp signal Vramp1 rises above the inductor current signal SiL, it triggers the control signals SH1 and SH3 to switch to an enabled state, thereby determining the first valley of the total inductor current ILsum. At time t2, the clock signal CLK1 switches to an enabled state, triggering the control signals SH1 and SH3 to switch to a disabled state. At time t3, when the ramp signal Vramp2 rises above the inductor current signal SiL, it triggers the control signals SH2 and SH4 to switch to an enabled state, thereby determining the second valley of the total inductor current ILsum. At time t4, the clock signal CLK2 switches to an enabled state, triggering the control signals SH2 and SH4 to switch to a disabled state.

Figure 10:
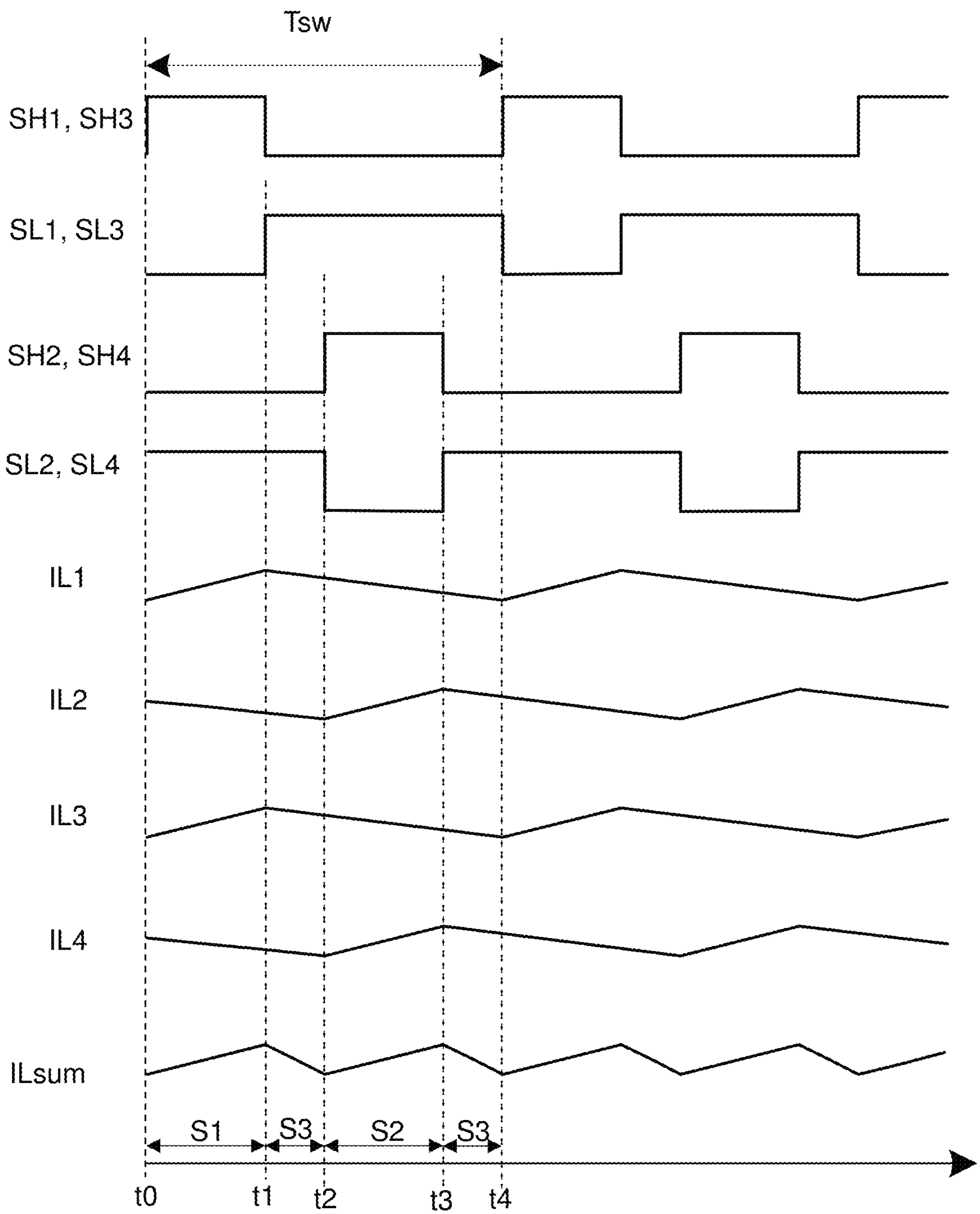
FIG. 10 shows a signal waveform diagram of related signals of a hybrid switching converter according to yet another embodiment of the present invention.

FIG. 10 illustrates signal waveform diagrams of related signals of a hybrid switching converter according to yet another embodiment of the present invention. The control signals SH1 to SH4, SL1 to SL4, inductor currents IL1 to IL4, and the total inductor current ILsum are shown in FIG. 10. The high-side switches QH1 to QH4 and the corresponding low-side switches QL1 to QL4 are inversely switched. For example, as shown in FIG. 10, the control signals SH1 and SH3 are inversely related to the control signals SL1 and SL3, while the control signals SH2 and SH4 are inversely related to the control signals SL2 and SL4. This results in the high-side switches QH1 and QH3 switching inversely to the low-side switches QL1 and QL3, and the high-side switches QH2 and QH4 switching inversely to the low-side switches QL2 and QL4. In this embodiment, the total inductor current ILsum is the sum of the inductor currents IL1 to IL4, resulting in a smaller ripple current and double the switching frequency compared to the individual inductor currents.

Figure 11:
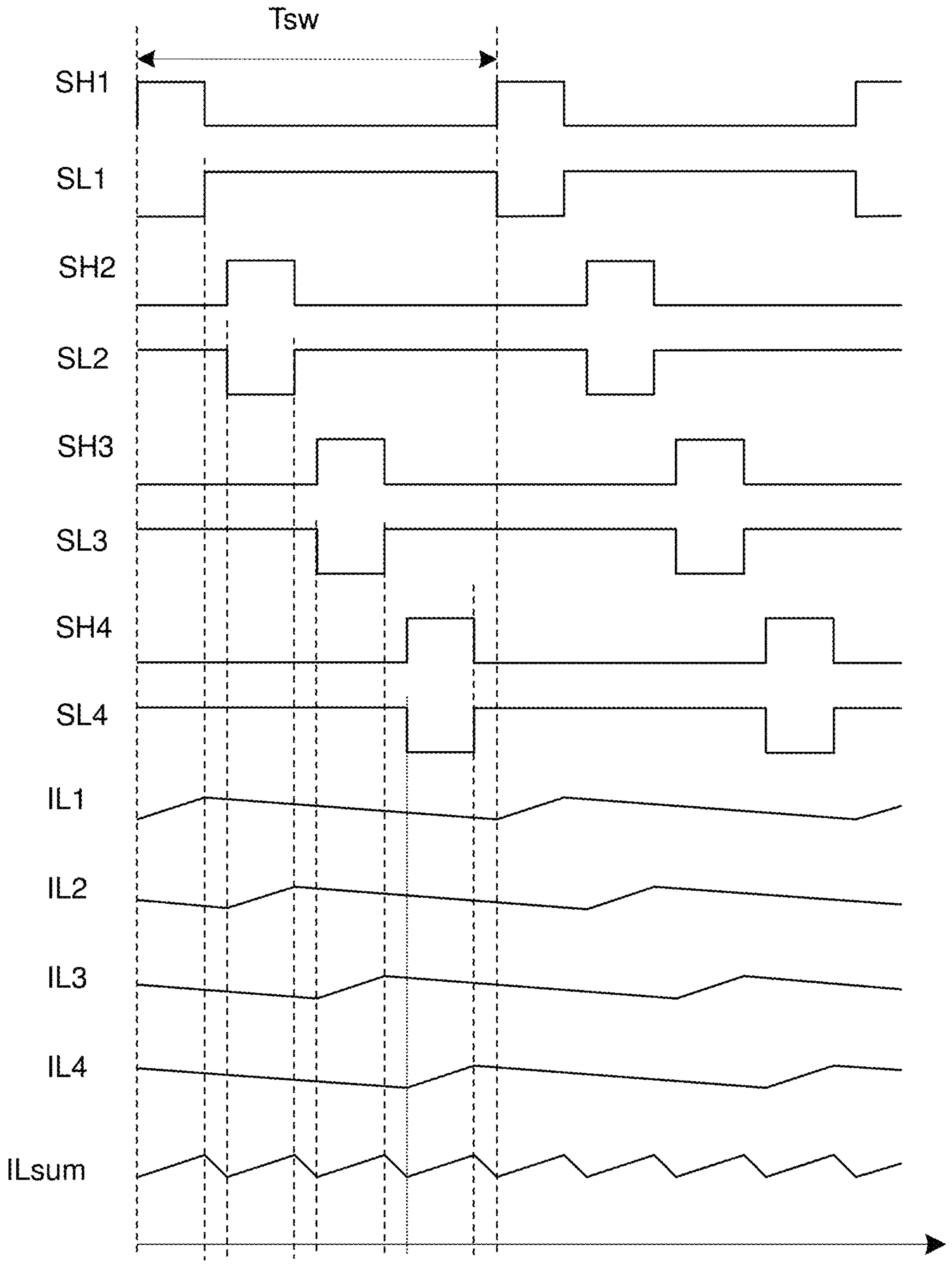
FIG. 11 shows a signal waveform diagram of related signals of a hybrid switching converter according to a further embodiment of the present invention.

FIG. 11 illustrates signal waveform diagrams of related signals of a hybrid switching converter according to a further embodiment of the present invention. The control signals SH1 to SH4, SL1 to SL4, inductor currents IL1 to IL4, and the total inductor current ILsum are shown in FIG.

11. This embodiment is similar to the embodiment shown in FIG. 10, and differs in that FIG. 10 represents control signals with 2-phase control, while this embodiment represents control signals with 4-phase control. Referring to FIG. 11 and FIG. 2, the control circuit 201 generates control signals with 4-phase control to alternately control the high-side switches QH1 to QH4 and the low-side switches QL1 to QL4, thereby sequentially magnetizing the inductors L1 to L4. In this embodiment, the total inductor current ILsum is the sum of the inductor currents IL1 to IL4, resulting in a smaller ripple current and four times the switching frequency compared to the individual inductor currents.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A hybrid switching converter configured to convert an input power into an output power, wherein the output power includes an output voltage and an output current, and the input power includes an input voltage, the hybrid switching converter comprising:

a plurality of switches, including a first to a fourth high-side switches;

a first to a fourth inductors, each having a first terminal electrically connected to the output voltage;

a first to a third flying capacitors, wherein a first terminal of the first flying capacitor is coupled to the input voltage through the first high-side switch, a first terminal of each of the second to third flying capacitors is respectively coupled to a first terminal of the corresponding preceding flying capacitor through the second to third high-side switches, and second terminals of the first to third flying capacitors are respectively electrically connected to second terminals of the first to third inductors at a first to a third switching nodes, a first terminal of the fourth high-side switch is electrically connected to the first terminal of the third flying capacitor, and a second terminal of the fourth high-side switch is electrically connected to a second terminal of the fourth inductor at a fourth switching node; and a control circuit configured to generate a plurality of control signals with a switching frequency to control the plurality of switches for periodic switching, thereby magnetizing the first to third inductors through the corresponding first to third flying capacitors and magnetizing the fourth inductor through the fourth high-side switch;

wherein the plurality of switches further comprises a first to a fourth low-side switches, each of the first to fourth low-side switches being coupled between the first to fourth switching nodes and a ground potential;

wherein the first to fourth inductors are magnetically coupled to each other via a magnetic material, or the first to fourth inductors are magnetically coupled in pairs via a magnetic material;

wherein the control circuit generates the control signals with 2-phase control to control switches of odd-numbered and even-numbered sequences among the first to fourth high-side switches and the first to fourth low-side switches, thereby alternately switching in a 2-phase sequence to alternately magnetize odd-numbered and even-numbered inductors among the first to fourth inductors;

wherein;

when the first high-side switch is in an on-state, the first inductor is magnetized by the input voltage through the first flying capacitor;

when the second high-side switch is in an on-state, the second inductor is magnetized through the first flying capacitor and the second flying capacitor;

when the third high-side switch is in an on-state, the third inductor is magnetized through the second flying capacitor and the third flying capacitor; and when the fourth high-side switch is in an on-state, the fourth inductor is magnetized through the third flying capacitor.

2. The hybrid switching converter of claim 1, wherein the first to fourth high-side switches and the corresponding first to fourth low-side switches are switched inversely.

3. The hybrid switching converter of claim 2, wherein the plurality of control signals operate the plurality of switches with a duty cycle close to 50%, such that a voltage conversion ratio between the input voltage and the output voltage is 8:1.

4. The hybrid switching converter of claim 1, wherein during steady-state operation, the first to fourth switching nodes periodically switch between ¼ of the input voltage and the ground potential, and voltages across the first to third flying capacitors correspond to ¾ to ¼ of the input voltage respectively.

5. The hybrid switching converter of claim 1, wherein the plurality of control signals includes a first control signal and a second control signal, and the control circuit determines pulse initiation points of the first and second control signals respectively based on comparisons between a total inductor current and respective first and second ramp signals, thereby achieving valley current mode control of the hybrid switching converter and inherently balancing voltages across the first to third flying capacitors, wherein the total inductor current is a summation of inductor currents of the first to fourth inductors and is related to the output current; and wherein in valley current mode, the pulse initiation point of the first control signal determines a first valley of the total inductor current, and the pulse initiation point of the second control signal determines a second valley of the total inductor current.

6. The hybrid switching converter of claim 5, wherein the first ramp signal and the second ramp signal have a phase difference of 180 degrees relative to each other.

7. A hybrid switching converter configured to convert an input power into an output power, wherein the output power includes an output voltage and an output current, and the input power includes an input voltage, the hybrid switching converter comprising:

a plurality of switches, including a first to a (K+1)th high-side switches, where K is an integer greater than 2;

a first to a (K+1)th inductors, each having a first terminal electrically connected to the output voltage;

a first to a Kth flying capacitors, wherein a first terminal of the first flying capacitor is coupled to the input voltage through the first high-side switch, a first terminal of each of the second to Kth flying capacitors is respectively coupled to a first terminal of the corresponding preceding flying capacitor through the second to Kth high-side switches, and second terminals of the first to Kth flying capacitors are respectively electrically connected to second terminals of the first to Kth inductors at a first to a Kth switching nodes, a first terminal of the (K+1)th high-side switch is electrically connected to the first terminal of the Kth flying capacitor, and a second terminal of the (K+1)th high-side switch is electrically connected to a second terminal of the (K+1)th inductor at a (K+1)th switching node; and a control circuit configured to generate a plurality of control signals with a switching frequency to control the plurality of switches for periodic switching, thereby magnetizing the first to Kth inductors through the corresponding first to Kth flying capacitors and magnetizing the (K+1)th inductor through the (K+1)th high-side switch;

wherein the plurality of switches further comprises a first to a (K+1)th low-side switches, each of the first to (K+1)th low-side switches being coupled between the first to (K+1)th switching nodes and a ground potential;

wherein (K+1) is an even number;

wherein:

the first to (K+1)th inductors are magnetically coupled to each other via a magnetic material, or the first to (K+1)th inductors are magnetically coupled in pairs via a magnetic material;

wherein the control circuit generates the control signals with 2-phase control to control switches of odd-numbered and even-numbered sequences among the first to (K+1)th high-side switches and the first to (K+1)th low-side switches, thereby alternately switching in a 2-phase sequence to alternately magnetize odd-numbered and even-numbered inductors among the first to (K+1)th inductors;

wherein the plurality of control signals includes a first control signal and a second control signal, and the control circuit determines pulse initiation points of the first and second control signals respectively based on comparisons between a total inductor current and respective first and second ramp signals, thereby achieving valley current mode control of the hybrid switching converter and inherently balancing voltages across the first to Kth flying capacitors, wherein the total inductor current is a summation of inductor currents of the first to (K+1)th inductors and is related to the output current;

wherein in valley current mode, the pulse initiation point of the first control signal determines a first valley of the total inductor current, and the pulse initiation point of the second control signal determines a second valley of the total inductor current; and wherein the first ramp signal and the second ramp signal have a phase difference of 180 degrees relative to each other.

8. The hybrid switching converter of claim 7, wherein the first to (K+1)th high-side switches and the corresponding first to (K+1)th low-side switches are switched inversely.

9. The hybrid switching converter of claim 8, wherein the plurality of control signals operate the plurality of switches with a duty cycle close to 50%, such that a voltage conversion ratio between the input voltage and the output voltage is 2 (K+1): 1.

10. The hybrid switching converter of claim 7, wherein during steady-state operation, the first to (K+1)th switching nodes periodically switch between 1/(K+1) of the input voltage and the ground potential, and the voltages across the first to Kth flying capacitors correspond to K/(K+1) to 1/(K+1) of the input voltage respectively.

* * * * *